US011500055B2

(12) United States Patent
Yu et al.

(10) Patent No.: US 11,500,055 B2
(45) Date of Patent: Nov. 15, 2022

(54) DETECTION METHOD AND DETECTION APPARATUS

(71) Applicant: ROBERT BOSCH GMBH, Stuttgart (DE)

(72) Inventors: Huajun Yu, Shanghai (CN); Zhuoqi Zeng, Shanghai (CN); Wei Wang, Shanghai (CN); Steven Liu, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 17/257,965

(22) PCT Filed: Jul. 12, 2018

(86) PCT No.: PCT/CN2018/095339
§ 371 (c)(1),
(2) Date: Jan. 5, 2021

(87) PCT Pub. No.: WO2020/010558
PCT Pub. Date: Jan. 16, 2020

(65) Prior Publication Data
US 2021/0223351 A1    Jul. 22, 2021

(51) Int. Cl.
*G01S 5/02* (2010.01)
*H04W 64/00* (2009.01)
(52) U.S. Cl.
CPC ......... *G01S 5/0246* (2020.05); *G01S 5/0252* (2013.01); *H04W 64/003* (2013.01)
(58) Field of Classification Search
CPC ...... G01S 5/0246; H04B 17/309; H04B 17/27
(Continued)

(56) References Cited

U.S. PATENT DOCUMENTS

| 9,229,102 B1* | 1/2016 | Wright ............... G01S 13/885 |
| 2011/0177786 A1* | 7/2011 | Marano ............... H04B 17/27 |
| | | 455/67.11 |

(Continued)

FOREIGN PATENT DOCUMENTS

| CN | 103399297 A | 11/2013 |
| CN | 103684524 A | 3/2014 |

(Continued)

OTHER PUBLICATIONS

International Search Report corresponding to PCT Application No. PCT/CN2018/095339, dated Apr. 12, 2019 Chinese-language and English-language document) (7 pages).

*Primary Examiner* — Thomas J Lett
(74) *Attorney, Agent, or Firm* — Maginot, Moore & Beck LLP (57) ABSTRACT

The disclosure relates to a detection method and a detection apparatus, the method including: calculating, when a location base station in an ultra-wideband location system receives a pulse response, values of a plurality of specified pulse response characteristics using the received pulse response, and using the calculated values as values of the plurality of specified pulse response characteristics of the location base station; calculating differences between the values of the plurality of specified pulse response characteristics of the location base station and values of the plurality of specified pulse response characteristics of the location base station at a previous time, and using the calculated differences as variations of the plurality of specified pulse response characteristics of the location base station; determining, based on at least the variations of the plurality of specified pulse response characteristics of the location base station and by means of a trained classifier, (Continued)

whether signal propagation in which the location base station participates is non-line-of-sight propagation.

10 Claims, 4 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 2016/0048710 A1 | 2/2016 | Nekoogar et al. | |
| 2016/0256117 A1* | 9/2016 | Baik | A61B 5/6803 |
| 2021/0325523 A1* | 10/2021 | Zeng | G01S 5/0294 |

FOREIGN PATENT DOCUMENTS

| | | |
|---|---|---|
| CN | 105911539 A | 8/2016 |
| CN | 107037402 A | 8/2017 |
| CN | 107205226 A | 9/2017 |

* cited by examiner

DETECTION METHOD AND DETECTION APPARATUS

This application is a 35 U.S.C. § 371 National Stage Application of PCT/CN2018/095339, filed on Jul. 12, 2018, the disclosure of which is incorporated herein by reference in its entirety.

The present disclosure relates to the field of ultra-wideband (UWB) location, and in particular to a detection method, a detection apparatus, a computing device, and a machine-readable storage medium.

BACKGROUND

UWB location is a technology that uses very narrow pulse responses and a bandwidth above 1 GHz to locate objects indoors. A UWB location system comprises a plurality of location base stations and a location tag attached to an object to be located. The location tag sends a pulse signal, and the pulse signal is channel modulated and then becomes a pulse response when reaching the location base stations. The UWB location system determines the location of the object by using the pulse response from the location tag that is received by the location base stations.

When signal propagation between the location base stations and the location tag is line-of-sight propagation without an obstacle, the UWB location system may obtain an accurate location of the object. However, if the signal propagation between the location base stations and the location tag is non-line-of-sight propagation with an obstacle, the location obtained by the UWB location system is inaccurate. Therefore, in UWB location, identification of non-line-of-sight propagation is very important.

At present, there has been a technology that uses a machine learning model as a classifier to identify non-line-of-sight propagation in UWB location. The machine learning model is trained to be able to classify, based on values of pulse response characteristics that are calculated by using pulse responses received by the location base stations, signal propagation between location base stations and a location tag as line-of-sight propagation or non-line-of-sight propagation.

However, in different scenes (e.g. airports, parking lots, railway stations, schools, etc.), values of pulse response characteristics that are calculated by using pulse responses from received by the location tag that are received by location base stations vary significantly. Therefore, in order to obtain, by means of training, a universal machine learning model for various scenes, it is required to collect pulse responses received by the location base stations in various scenes, so as to calculate a great number of values of pulse response characteristics as training sample data to train a machine learning model. Consequently, the existing method for identifying non-line-of-sight propagation by means of a machine learning model is costly.

SUMMARY

In view of the above problem in the prior art, embodiments of the present disclosure provide a detection method, a detection apparatus, a computing device, and a machine-readable storage medium, which can reduce the cost of using a classifier to identify non-line-of-sight propagation.

The embodiments of the present disclosure further provide a detection method, a detection apparatus, a computing device, and a machine-readable storage medium, which can facilitate the learning of a ranging error of a location base station in an ultra-wideband location system.

A detection method according to an embodiment of the present disclosure comprises: calculating, when a location base station in an ultra-wideband location system receives a pulse response from a location tag at this time, values of a plurality of specified pulse response characteristics by using the received pulse response, and using the calculated values as values of the plurality of specified pulse response characteristics of the location base station at this time; calculating differences between the values of the plurality of specified pulse response characteristics of the location base station at this time and values of the plurality of specified pulse response characteristics of the location base station at a previous time, and using the calculated differences as variations of the plurality of specified pulse response characteristics of the location base station at this time; and determining, based on at least the variations of the plurality of specified pulse response characteristics of the location base station at this time and by means of a trained classifier, whether signal propagation in which the location base station participates at this time is non-line-of-sight propagation, wherein the classifier is trained to be able to classify, based on variations of the plurality of specified pulse response characteristics of any location base station in the ultra-wideband location system, signal propagation in which the location base station participates as line-of-sight propagation or non-line-of-sight propagation.

A detection method according to an embodiment of the present disclosure comprises: calculating, when a location base station in an ultra-wideband location system receives a pulse response from a location tag, values of a plurality of specified pulse response characteristics by using the received pulse response; and determining, based on the calculated values of the plurality of pulse response characteristics and by means of a trained classifier, the level of a ranging error of the location base station, wherein the classifier is trained to be able to classify a ranging error of any location base station as a corresponding level based on values of the plurality of pulse response characteristics of the location base station in the ultra-wideband location system.

A detection apparatus according to an embodiment of the present disclosure comprises: a first calculation module configured to calculate, when a location base station in an ultra-wideband location system receives a pulse response from a location tag at this time, values of a plurality of specified pulse response characteristics by using the received pulse response, and use the calculated values as values of the plurality of specified pulse response characteristics of the location base station at this time; a second calculation module configured to calculate differences between the values of the plurality of specified pulse response characteristics of the location base station at this time and values of the plurality of specified pulse response characteristics of the location base station at a previous time as variations of the plurality of specified pulse response characteristics of the location base station at this time; and a determination module configured to determine, based on at least the variations of the plurality of specified pulse response characteristics of the location base station at this time and by means of a trained classifier, whether signal propagation in which the location base station participates at this time is non-line-of-sight propagation, wherein the classifier is trained to be able to classify, based on variations of the plurality of specified pulse response characteristics of any location base station in the ultra-wideband location system, signal propagation in which the location base station participates as line-of-sight propagation or non-line-of-sight propagation.

A detection apparatus according to an embodiment of the present disclosure comprises: a calculation module configured to calculate, when a location base station in an ultra-wideband location system receives a pulse response from a location tag, values of a plurality of specified pulse response characteristics by using the received pulse response; and a determination module configured to determine, based on the calculated values of the plurality of pulse response characteristics and by means of a trained classifier, the level of a ranging error of the location base station, wherein the classifier is trained to be able to classify a ranging error of any location base station as a corresponding level based on values of the plurality of pulse response characteristics of the location base station.

A computing device according to an embodiment of the present disclosure comprises: a processor; and a memory storing executable instructions that, when executed, cause the processor to perform the above-mentioned method.

A machine-readable storage medium according to an embodiment of the present disclosure has executable instructions thereon that, when executed, cause a machine to perform the above-mentioned method.

In the solutions of the embodiments of the present disclosure, a classifier that is trained to be able to classify signal propagation in which a location base station in an ultra-wideband location system participates as line-of-sight propagation or non-line-of-sight propagation based on variations of pulse response characteristics of the location base station is used to determine whether the signal propagation in which the location base station in the ultra-wideband location system participates is non-line-of-sight propagation. Variations in pulse response characteristics calculated by using pulse responses that are collected in various scenes and received by location base stations at different times have very little difference from each other. Therefore, a universal classifier for various scenes can be obtained simply by collecting, in some typical scenes, pulse responses that are received by the location base stations from location tag at different times and using the collected pulse responses to calculate variations of pulse response characteristics as training sample data to train a classifier used for identifying non-line-of-sight propagation. Therefore, compared with the prior art, by means of the solutions of the embodiments of the present disclosure, the cost of using a classifier to identify non-line-of-sight propagation can be reduced.

In addition, in the solutions of the embodiments of the present disclosure, a classifier that is trained to be able to classify a ranging error of a location base station as a corresponding level based on values of pulse response characteristics of the location base station in the ultra-wideband location system is used to determine a level of the ranging error of the location base station in the ultra-wideband location system, and it is very convenient to learn a ranging error of the location base station. Therefore, compared with the prior art, the solutions of the embodiments of the present disclosure can facilitate the learning of a ranging error of a location base station.

BRIEF DESCRIPTION OF THE DRAWINGS

Other objectives, features, benefits and advantages of the present disclosure will become more apparent from the following detailed description in conjunction with the accompanying drawings. In the figures.

DETAILED DESCRIPTION

Various embodiments of the present disclosure are described below in detail with reference to the accompanying drawings.

I. Identification of Non-Line-of-Sight Propagation

The inventors have conducted a great number of experiments and researches and found that in a UWB location system, signal propagation between location base stations and a location tag changes over time in the following four manners: from line-of-sight propagation to line-of-sight propagation, from line-of-sight propagation to non-line-of-sight propagation, from non-line-of-sight propagation to line-of-sight propagation, and from non-line-of-sight propagation to non-line-of-sight propagation. In addition, in identical signal propagation change manners, variations of pulse response characteristics calculated by using pulse responses that are collected in various scenes and received by the location base stations from the location tag at different times have very little difference from each other.

Based on the above findings, in the embodiments of the present disclosure, variations of pulse response characteristics are used as training sample data to train a machine learning model used for identifying non-line-of-sight propagation. A universal machine learning model for various scenes can be obtained simply by collecting, in some typical scenes, pulse responses that are received by the location base stations from the location tag at different times and using the collected pulse responses to calculate variations of pulse response characteristics as a machine learning model used for identifying non-line-of-sight propagation. Thus, the cost of using a machine learning model to identify non-line-of-sight propagation can be greatly reduced.

Figure 1:
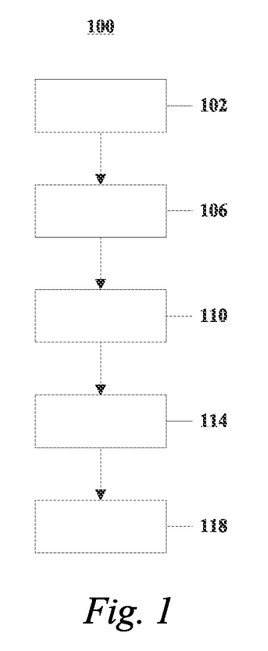
FIG. 1 shows an overall flowchart of a model training method according to a first embodiment of the present disclosure.

FIG. 1 shows an overall flowchart of a model training method according to a first embodiment of the present disclosure. The method 100 shown in FIG. 1 may be carried out by any computing device having a computing capability. The computing device can be, but is not limited to, a desktop computer, a notebook computer, a tablet computer, a server, a smartphone, or the like.

As shown in FIG. 1, in block 102, a plurality of pulse response pairs is acquired. Each pulse response pair comprises a first pulse response and a second pulse response that are received by a location base station in a UWB location system in one of a plurality of occasions. The first pulse response is received from a location tag at a time in line-of-sight propagation or non-line-of-sight propagation, and the second pulse response is received from a location tag at another time after the time in line-of-sight propagation or non-line-of-sight propagation. By way of example but not limitation, the plurality of scenes may include airports, railway stations, parking lots, shopping malls, etc.

In block 106, the acquired pulse response pairs are divided into a first signal group, a second signal group, a third signal group, and a fourth signal group. Each signal group comprises several pulse response pairs.

The first signal group corresponds to a case where signal propagation changes from line-of-sight propagation to line-of-sight propagation. To be specific, a first pulse response $g1i$-1 in any pulse response pair $G1i$ comprised in the first signal group is received when signal propagation between a location base station receiving the first pulse response $g1i$-1 and a location tag sending a pulse signal corresponding to the first pulse response $g1i$-1 (that is, signal propagation in which the location base station receiving the first pulse response $g1i$-1 participates) is line-of-sight propagation, and a second pulse response $g1i$-2 in the pulse response pair $G1i$ is received when signal propagation between a location base station receiving the second pulse response $g1i$-2 and a location tag sending a pulse signal corresponding to the second pulse response $g1i$-2 is line-of-sight propagation. In practice, the plurality of pulse response pairs comprised in the first signal group are received by a plurality of location base stations F1D during the change of signal propagation in which the plurality of location base stations F1D participate from line-of-sight propagation to line-of-sight propagation.

The second signal group corresponds to a case where signal propagation changes from line-of-sight propagation to non-line-of-sight propagation. To be specific, a first pulse response $g2i$-1 in any pulse response pair $G2i$ comprised in the second signal group is received when signal propagation between a location base station receiving the first pulse response $g2i$-1 and a location tag sending a pulse signal corresponding to the first pulse response $g2i$-1 is line-of-sight propagation, and a second pulse response $g2i$-2 in the pulse response pair $G2i$ is received when signal propagation between a location base station receiving the second pulse response $g2i$-2 and a location tag sending a pulse signal corresponding to the second pulse response $g2i$-2 is non-line-of-sight propagation. In practice, the plurality of pulse response pairs comprised in the second signal group are received by a plurality of location base stations F2D during the change of signal propagation in which the plurality of location base stations F2D participate from line-of-sight propagation to non-line-of-sight propagation.

The third signal group corresponds to a case where signal propagation changes from non-line-of-sight propagation to line-of-sight propagation. To be specific, a first pulse response $g3i$-1 in any pulse response pair $G3i$ comprised in the third signal group is received when signal propagation between a location base station receiving the first pulse response $g3i$-1 and a location tag sending a pulse signal corresponding to the first pulse response $g3i$-1 is non-line-of-sight propagation, and a second pulse response $g3i$-2 in the pulse response pair $G3i$ is received when signal propagation between a location base station receiving the second pulse response $g3i$-2 and a location tag sending a pulse signal corresponding to the second pulse response $g3i$-2 is line-of-sight propagation. In practice, the plurality of pulse response pairs comprised in the third signal group are received by a plurality of location base stations F3D during the change of signal propagation in which the plurality of location base stations F3D participate from line-of-sight propagation to non-line-of-sight propagation.

The fourth signal group corresponds to a case where signal propagation changes from non-line-of-sight propagation to non-line-of-sight propagation. To be specific, a first pulse response $g4i$-1 in any pulse response pair $G4i$ comprised in the fourth signal group is received when signal propagation between a location base station receiving the first pulse response $g4i$-1 and a location tag sending a pulse signal corresponding to the first pulse response $g4i$-1 is non-line-of-sight propagation, and a second pulse response $g4i$-2 in the pulse response pair $G4i$ is received when signal propagation between a location base station receiving the second pulse response $g4i$-2 and a location tag sending a pulse signal corresponding to the second pulse response $g4i$-2 is non-line-of-sight propagation. In practice, the plurality of pulse response pairs comprised in the fourth signal group are received by a plurality of location base stations F4D during the change of signal propagation in which the plurality of location base stations F4D participate from line-of-sight propagation to non-line-of-sight propagation.

In block 110, a plurality of characteristic value vector pairs of each of the first signal group, the second signal group, the third signal group, and the fourth signal group are calculated. Any characteristic value vector pair ck of each signal group Cj comprises a first characteristic value vector and a second characteristic value vector. The first characteristic value vector in the characteristic value vector pair ck is constituted by values of a plurality of specified pulse response characteristics PPT1 that are calculated by using a first pulse response in one of pulse response pairs comprised in the signal group Cj, and the second characteristic value vector in the characteristic value vector pair ck is constituted by values of the plurality of specified pulse response characteristics PPT1 that are calculated by using a second pulse response in the pulse response pair comprised in the signal group Cj.

Calculating values of pulse response characteristics by using pulse responses is a well-known technology in the field of UWB location, and the detailed description thereof is omitted herein. By way of example but not limitation, the plurality of specified pulse response characteristics PPT1 may be selected from the following pulse response characteristics depending on actual situations: a distance between a location base station and a location tag, received signal energy, a maximum amplitude, a maximum amplitude rise time, a standard deviation, a power difference between the first path and the strongest path, a power ratio between the first path and the strongest path, a signal-to-noise ratio (SNR), a waveform factor, a delay between receiving a pulse peak value and a start time, an average excess delay, mean square delay spread, kurtosis, a crest factor, peak-to-average-power ratio, and skewness.

In block 114, a plurality of characteristic variation vectors of each of the first signal group, the second signal group, the third signal group, and the fourth signal group are calculated. Any characteristic variation vector of each signal group Cj is a difference between a first characteristic value vector and a second characteristic value comprised in one of characteristic value vector pairs in the signal group Cj. Herein, each characteristic variation vector of the first signal group represents variations of the plurality of specified pulse response characteristics PPT1 of one of the plurality of location base stations F1D, each characteristic variation vector of the second signal group represents variations of the plurality of specified pulse response characteristics PPT1 of one of the plurality of location base stations F2D, each characteristic variation vector of the third signal group represents variations of the plurality of specified pulse response characteristics PPT1 of one of the plurality of location base stations F3D, and each characteristic variation vector of the fourth signal group represents variations of the plurality of specified pulse response characteristics PPT1 of one of the plurality of location base stations F4D.

In block 118, the characteristic variation vectors of the first signal group are used as negative training samples and the characteristic variation vectors of the second signal group are used as positive training samples to train a first machine learning model M1 as a classifier for classifying signal propagation in which a location base station participates as line-of-sight propagation or non-line-of-sight propagation based on variations of the plurality of pulse response characteristics PPT1 of the location base station; and the characteristic variation vectors of the third signal group are used as negative training samples and the characteristic variation vectors of the fourth signal group are used as positive training samples to train a second machine learning model M2 as a classifier for classifying the signal propagation in which the location base station participates as line-of-sight propagation or non-line-of-sight propagation based on the variations of the plurality of pulse response characteristics PPT1 of the location base station.

The first machine learning model M1 is applicable to a case where before change, the signal propagation in which the location base station participates is line-of-sight propagation, while the second machine learning model M2 is applicable to a case where before change, the signal propagation in which the location base station participates is non-line-of-sight propagation. By way of example but not limitation, the first machine learning model M1 and the second machine learning model M2 may be decision trees, neural networks, support vector machines, or the like.

Figure 2:
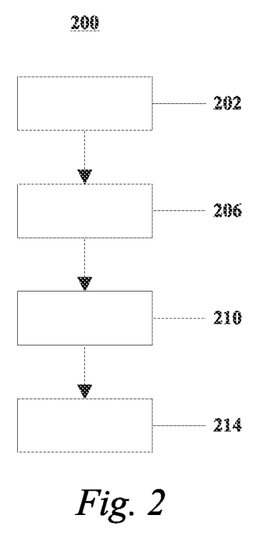
FIG. 2 shows an overall flowchart of a detection method according to the first embodiment of the present disclosure.

FIG. 2 shows an overall flowchart of a detection method according to the first embodiment of the present disclosure. The method 200 shown in FIG. 2 may be carried out by any computing device having a computing capability. The computing device can be, but is not limited to, a desktop computer, a notebook computer, a tablet computer, a server, a smartphone, or the like.

As shown in FIG. 2, in block 202, when a location base station CP in a UWB location system receives a pulse response PUL from a location tag BQ at this time, the received pulse response PUL is used to calculate values of the plurality of specified response signal characteristics PPT1 as values of the plurality of specified pulse response characteristics PPT1 of the location base station CP at this time.

In block 206, differences between the values of the plurality of specified pulse response characteristics PPT1 of the location base station CP at this time and values of the plurality of specified pulse response characteristics PPT1 of the location base station CP at a previous time are calculated and used as variations of the plurality of specified pulse response characteristics PPT1 of the location base station CP at this time.

In block 210, a corresponding machine learning model is selected from the trained first machine learning model M1 and second machine learning model M2 depending on whether the signal propagation in which the location base station CP participates at the previous time is line-of-sight propagation or non-line-of-sight propagation. Herein, when the signal propagation in which the location base station CP participates at the previous time is line-of-sight propagation, the first learning model M1 is selected, and when the signal propagation in which the location base station CP participates at the previous time is non-line-of-sight propagation, the second learning model M2 is selected.

In block 214, the variations of the plurality of specified pulse response characteristics PPT1 of the location base station CP at this time are input into the selected machine learning model to determine whether signal propagation in which the location base station CP participates at this time (that is, signal propagation between the location base station CP and the location tag BQ) is non-line-of-sight propagation.

II. Determination of a Level of a Ranging Error of a Location Base Station

Time difference of arrival (TDOA) location is a commonly used wireless location technology which uses time differences between signals received by a plurality of base stations from a to-be-detected object to calculate a position of the to-be-detected object. When the TDOA location technology is employed in a UWB location system to calculate a position of a location tag, if the plurality of location base stations all receive pulse responses from a same location tag, sometimes, the position of the location tag that is calculated based on pulse responses received from some of the plurality of location base stations is accurate, while the position of the location tag that is calculated based on pulse responses received from the other location base stations is inaccurate.

The inventors have found through comprehensive analysis that in the UWB location system, if ranging errors of several location base stations having received pulse responses from a same location tag have little difference from each other, the position of the location tag that is calculated by using the TDOA location technology based on the pulse responses received by the several location base stations is basically accurate. However, if ranging errors of several location base stations having received pulse responses from a same location tag have significant difference with each other, the position of the location tag that is calculated by using the TDOA location technology based on the pulse responses received by the several location base stations is inaccurate. If the ranging errors of the several location base stations having received pulse responses from the same location tag have little difference with each other, when the position of the location tag is calculated by using the TDOA location technology based on the pulse responses received by the several location base stations, the calculated position of the location tag is basically accurate because the ranging errors of the several location base stations can be basically offset by each other. Herein, a ranging error of a location base station refers to a difference between an estimated distance between the location base station and a location tag that is calculated by using a pulse response from the location tag that is received by the location base station and a real distance between the location base station and the location tag.

Therefore, if ranging errors of location base stations can be known in advance, pulse responses received by location base stations with basically the same ranging errors are selected to calculate a position of the location tag by using the TDOA location technology, and a real position of the location tag can be calculated. However, ranging errors of location base stations do not usually remain unchanged, and solutions facilitating determination of ranging errors of the location base stations are not provided in the prior art.

The inventors have conducted a great deal of research and found that as a signal propagation path between a location base station and a location tag is blocked more severely, a ranging error of the location base station becomes larger, and if the severity of blocking the signal propagation path between the location base station and the location tag changes, values of pulse response characteristics that are calculated based on a pulse response received from the location tag by the location base station change accordingly.

Based on the above findings, in the embodiments of the present disclosure, ranging errors of location base stations are divided into a plurality of different ranging error ranges and a different level is assigned to each ranging error range, a machine learning model as a classifier used for classifying a ranging error of a location base station as a corresponding level based on values of pulse response characteristics of the location base station is trained, and then the level of the ranging error of the location base station is determined by the trained machine learning model, so as to learn a ranging error of the location base station.

Figure 3:
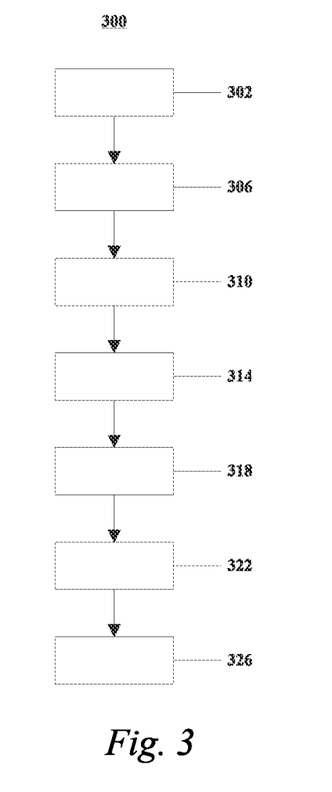
FIG. 3 shows an overall flowchart of a model training method according to a second embodiment of the present disclosure.

FIG. 3 shows an overall flowchart of a model training method according to a second embodiment of the present disclosure. The method 300 shown in FIG. 3 may be carried out by any computing device having a computing capability. The computing device can be, but is not limited to, a desktop computer, a notebook computer, a tablet computer, a server, a smartphone, or the like.

As shown in FIG. 3, in block 302, a plurality of pulse responses PPS received by a plurality of location base stations PBS and respective real distances specific to the plurality of location base stations PBS are acquired.

The plurality of location base stations PBS are one or more location base stations in a UWB location system. Each of the plurality of pulse responses PPS is received by one of the plurality of location base stations PBS from a location tag. A real distance specific to any location base station in the plurality of location base stations PBS represents a real distance between the location base station and a location tag sending a pulse message corresponding to a pulse response PPSi when the location base station receives said pulse response PPSi in the plurality of pulse responses PPS that is received by the location base station. By way of example but not limitation, the real distance between the location base station and the location tag sending the pulse message corresponding to the pulse response PPSi may be obtained after image processing is performed on an image shot by a camera device arranged in a scene of the location base station.

In block 306, respective estimated distances specific to the plurality of location base stations PBS are calculated.

An estimated distance specific to any location base station in the plurality of location base stations PBS represents a distance, calculated by using a pulse response PPSi in the plurality of pulse responses PPS that is received by the location base station, between the location base station and a location tag sending a pulse message corresponding to said pulse response PPSi when the location base station receives said pulse response PPSi. By way of example but not limitation, a product of a light velocity and a time difference between a moment at which the location base station receives the pulse response PPSi and a moment, carried in the pulse response PPSi, at which the pulse response PPSi is sent may be calculated and used as the estimated distance specific to the location base station.

In block 310, respective ranging errors of the plurality of location base stations PBS are calculated. A ranging error of any location base station in the plurality of location base stations PBS represents an absolute value of a difference between the estimated distance and the real distance specific to the location base station.

In block 314, a mapping relationship YG between a plurality of levels L of ranging errors and a plurality of different ranging error ranges R is set. In the mapping relationship YG, each of the plurality of levels L corresponds to one of the plurality of ranging error ranges R. By way of example but not limitation, the plurality of ranging error ranges R may include three ranging error ranges: 0 centimeters to 20 centimeters, 20 centimeters to 40 centimeters, and 40 centimeters to 60 centimeters.

In block 318, levels of respective ranging errors of the plurality of location base stations PBS are determined according to the mapping relationship YG and ranging error ranges within which the respective ranging errors of the plurality of location base stations PBS fall.

In block 322, a pulse response in the plurality of pulse responses PPS that is received by any location base station in the plurality of location base stations PBS is used to calculate values of a plurality of specified pulse response characteristics PPT2 as values of a plurality of specified pulse response characteristics PPT2 of the location base station, so as to obtain respective values of the plurality of specified pulse response characteristics PPT2 of the plurality of location base stations PBS.

The plurality of specified pulse response characteristics PPT2 may be selected from the following pulse response characteristics depending on actual situations: a distance between a location base station and a location tag, received signal energy, a maximum amplitude, a maximum amplitude rise time, a standard deviation, a power difference between the first path and the strongest path, a power ratio between the first path and the strongest path, a signal-to-noise ratio (SNR), a waveform factor, a delay between receiving a pulse peak value and a start time, an average excess delay, mean square delay spread, kurtosis, a crest factor, peak-to-average-power ratio, and skewness.

In block 326, the respective values of the plurality of specified pulse response characteristics PPT2 of the plurality of location base stations PBS and the respective levels of the ranging errors are used to as training sample data to train a machine learning model M3 as a classifier. The machine learning model M3 is trained to be able to classify a ranging error of any location base station as a corresponding level based on values of the plurality of pulse response characteristics PPT2 of the location base station.

Figure 4:
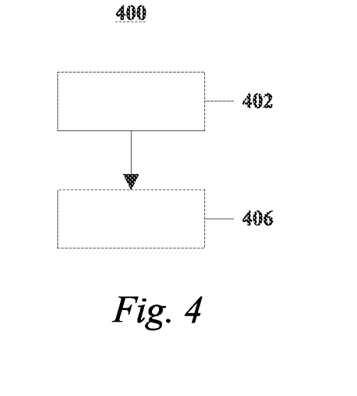
FIG. 4 shows an overall flowchart of a detection method according to the second embodiment of the present disclosure.

FIG. 4 shows an overall flowchart of a detection method according to the second embodiment of the present disclosure. The method 400 shown in FIG. 4 may be carried out by any computing device having a computing capability. The computing device can be, but is not limited to, a desktop computer, a notebook computer, a tablet computer, a server, a smartphone, or the like.

As shown in FIG. 4, in block 402, when a location base station CP in a UWB location system receives a pulse response PUL from a location tag BQ, the received pulse response PUL is used to calculate values of the plurality of specified response signal characteristics PPT2 as values of the plurality of specified response signal characteristics PPT2 of the location base station CP.

In block 406, the values of the plurality of specified response signal characteristics PPT2 of the location base station CP are input into a trained machine learning model M3 to determine a level of a ranging error of the location base station CP.

The determined level of the ranging error of the location base station CP may be displayed for use by a user.

When a plurality of location base stations in the UWB location system receive pulse responses from a same location tag, the method 400 may be used to determine respective levels of ranging errors of the plurality of location base station, and then pulse responses received by location base stations with a same level of ranging errors in the plurality of location base stations are used to determine the position of a location tag through a TDOA location technology. This can effectively improve location accuracy compared with a case where pulse signals received by location base stations with different levels of ranging errors are used for location through the TDOA location technology.

Other Variations

Those skilled in the art will understand that although in the above first embodiment, a machine learning model used for classifying signal propagation in which a location base station participates as line-of-sight propagation or non-line-of-sight propagation based on variations of pulse response characteristics of the location base station comprises two models, namely, a first machine learning model M1 and a first machine learning model M2, the present disclosure is not limited thereto. In some other embodiments of the present disclosure, a machine learning model used for classifying signal propagation in which a location base station participates as line-of-sight propagation or non-line-of-sight propagation based on variations of pulse response characteristics of the location base station may alternatively be a single machine learning model. In the case of a single machine learning model, characteristic variation vectors of a first signal group and a third signal group may be used as negative training samples and characteristic variation vectors of a second signal group and a fourth signal group may be used as positive training samples to train the single machine learning model, and the method 200 does not comprise block 210.

Those skilled in the art will understand that the method 100 is merely an exemplary method for training a machine learning model used for classifying signal propagation in which a location base station participates as line-of-sight propagation or non-line-of-sight propagation based on variations of pulse response characteristics of the location base station. Alternatively, any other suitable methods may be used to train the machine learning model used for classifying the signal propagation in which the location base station participates as line-of-sight propagation or non-line-of-sight propagation based on the variations of the pulse response characteristics of the location base station.

Those skilled in the art will understand that the method 300 is merely an exemplary method for training a machine learning model used for classifying a ranging error of a location base station as a corresponding level based on values of pulse response characteristics of the location base station. Alternatively, any other suitable methods may be used to train the machine learning model used for classifying the ranging error of the location base station as the corresponding level based on the values of the pulse response characteristics of the location base station.

Those skilled in the art will understand that although in the above first embodiment and second embodiment, the classifiers used are machine learning models (namely, the first machine learning model M1, the first machine learning model M2, and the machine learning module M3), the present disclosure is not limited thereto. In some other embodiments of the present disclosure, a classifier used may alternatively be any other suitable type of classifier other than the machine learning model.

Figure 5A:
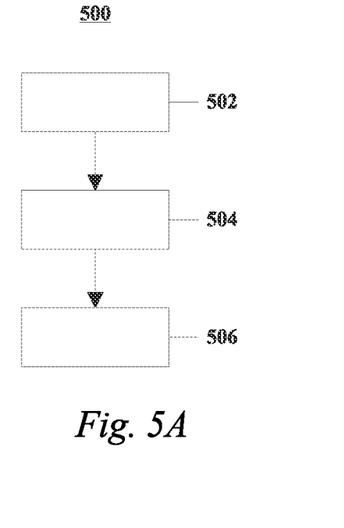
FIG. 5A shows a flowchart of a detection method according to one embodiment of the present disclosure.

FIG. 5A shows a flowchart of a detection method according to an embodiment of the present disclosure. The detection method 500 shown in FIG. 5A may be carried out by any computing device having a computing capability. The computing device can be, but is not limited to, a desktop computer, a notebook computer, a tablet computer, a server, a smartphone, or the like.

As shown in FIG. 5A, the detection method 500 may comprise block 502 of calculating, when a location base station in an ultra-wideband location system receives a pulse response from a location tag at this time, values of a plurality of specified pulse response characteristics by using the received pulse response, and using the calculated values as values of the plurality of specified pulse response characteristics of the location base station at this time.

The detection method 500 may further comprise block 504 of computing differences between the values of the plurality of specified pulse response characteristics of the location base station at this time and values of the plurality of specified pulse response characteristics of the location base station at a previous time as variations of the plurality of specified pulse response characteristics of the location base station at this time.

The detection method 500 may further comprise block 506 of determining, based on at least the variations of the plurality of specified pulse response characteristics of the location base station at this time and by means of a trained classifier, whether signal propagation in which the location base station participates at this time is non-line-of-sight propagation, wherein the classifier is trained to be able to classify, based on variations of the plurality of specified pulse response characteristics of any location base station in the ultra-wideband location system, signal propagation in which the location base station participates as line-of-sight propagation or non-line-of-sight propagation.

In one aspect, the classifier comprises a first classifier and a second classifier, wherein positive training samples and negative training samples used for training the first classifier are respectively variations of the plurality of specified pulse response characteristics of a first plurality of location base stations during the change of signal propagation in which the first plurality of location base stations participate from line-of-sight propagation to non-line-of-sight propagation and variations of the plurality of specified pulse response characteristics of a second plurality of location base stations during the change of signal propagation in which the second plurality of location base stations participate from line-of-sight propagation to line-of-sight propagation, and positive training samples and negative training samples used for training the second classifier are respectively variations of the plurality of specified pulse response characteristics of a third plurality of location base stations during the change of signal propagation in which the third plurality of location base stations participate from non-line-of-sight propagation to non-line-of-sight propagation and variations of the plurality of specified pulse response characteristics of a fourth plurality of location base stations during the change of signal propagation in which the fourth plurality of location base stations participate from non-line-of-sight propagation to line-of-sight propagation, and wherein said determining whether signal propagation in which the location base station participates at this time is non-line-of-sight propagation comprises: selecting, depending on whether the signal propagation in which the location base station participates at the previous time is line-of-sight propagation or non-line-of-sight propagation, a corresponding classifier from the first classifier and the second classifier, wherein when the signal propagation in which the location base station participates at the previous time is line-of-sight propagation, the first classifier is selected, otherwise the second classifier is selected; and using the selected classifier to determine, based on the variations of the plurality of specified pulse response characteristics of the location base station at this time, whether the signal propagation in which the location base station participates at this time is non-line-of-sight propagation.

In another aspect, the classifier is a single classifier, wherein positive training samples used for training the classifier comprise variations of the plurality of specified pulse response characteristics of a fifth plurality of location base stations during the change of signal propagation in which the fifth plurality of location base stations participate from line-of-sight propagation to non-line-of-sight propagation and variations of the plurality of specified pulse response characteristics of a sixth plurality of location base stations during the change of signal propagation in which the sixth plurality of location base stations participate from non-line-of-sight propagation to non-line-of-sight propagation, and negative training samples used for training the classifier comprise variations of the plurality of specified pulse response characteristics of a seventh plurality of location base stations during the change of signal propagation in which the seventh plurality of location base stations participate from line-of-sight propagation to line-of-sight propagation and variations of the plurality of specified pulse response characteristics of an eighth plurality of location base stations during the change of signal propagation in which the eighth plurality of location base stations participate from non-line-of-sight propagation to line-of-sight propagation.

Figure 5B:
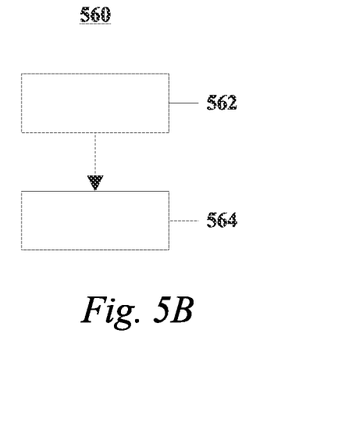
FIG. 5B shows a flowchart of a detection method according to another embodiment of the present disclosure.

FIG. 5B shows a flowchart of a detection method according to another embodiment of the present disclosure. The detection method 560 shown in FIG. 5B may be carried out by any computing device having a computing capability. The computing device can be, but is not limited to, a desktop computer, a notebook computer, a tablet computer, a server, a smartphone, or the like.

As shown in FIG. 5B, the detection method 560 may comprise block 562 of calculating, when a location base station in an ultra-wideband location system receives a pulse response from a location tag, values of a plurality of specified pulse response characteristics by using the received pulse response.

The detection method 560 may further comprise block 564 of determining a level of a ranging error of the location base station based on the calculated values of the plurality of pulse response characteristics and by means of a trained classifier, wherein the classifier is trained to be able to classify a ranging error of any location base station as a corresponding level based on values of the plurality of pulse response characteristics of the location base station in the ultra-wideband location system.

Figure 6A:
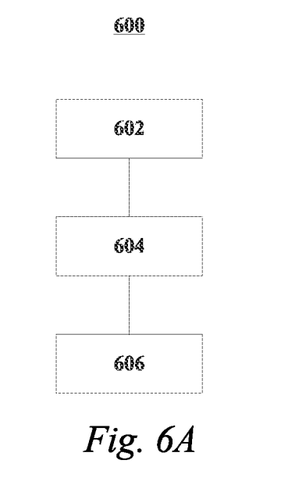
FIG. 6A shows a schematic diagram of a detection apparatus according to one embodiment of the present disclosure.

FIG. 6A shows a schematic diagram of a detection apparatus according to an embodiment of the present disclosure. The detection apparatus 600 shown in FIG. 6A may be implemented by software, hardware, or a combination of software and hardware. The detection apparatus 600 shown in FIG. 6A may be, for example, installed on any computing device having a computing capability.

As shown in FIG. 6A, the detection apparatus 600 may comprise a first calculation module 602, a second calculation module 604, and a determination module 606. The first calculation module 602 is configured to use, when a location base station in an ultra-wideband location system receives a pulse response from a location tag at this time, the received pulse response to calculate values of a plurality of specified pulse response characteristics as values of the plurality of specified pulse response characteristics of the location base station at this time. The second calculation module 604 is configured to calculate differences between the values of the plurality of specified pulse response characteristics of the location base station at this time and values of the plurality of specified pulse response characteristics of the location base station at a previous time as variations of the plurality of specified pulse response characteristics of the location base station at this time. The determination module 606 is configured to determine, based on at least the variations of the plurality of specified pulse response characteristics of the location base station at this time and by means of a trained classifier, whether signal propagation in which the location base station participates at this time is non-line-of-sight propagation, wherein the classifier is trained to be able to classify, based on variations of the plurality of specified pulse response characteristics of any location base station in the ultra-wideband location system, signal propagation in which the location base station participates as line-of-sight propagation or non-line-of-sight propagation.

In one aspect, the classifier comprises a first classifier and a second classifier, wherein positive training samples and negative training samples used for training the first classifier are respectively variations of the plurality of specified pulse response characteristics of a first plurality of location base stations during the change of signal propagation in which the first plurality of location base stations participate from line-of-sight propagation to non-line-of-sight propagation and variations of the plurality of specified pulse response characteristics of a second plurality of location base stations during the change of signal propagation in which the second plurality of location base stations participate from line-of-sight propagation to line-of-sight propagation, and positive training samples and negative training samples used for training the second classifier are respectively variations of the plurality of specified pulse response characteristics of a third plurality of location base stations during the change of signal propagation in which the third plurality of location base stations participate from non-line-of-sight propagation to non-line-of-sight propagation and variations of the plurality of specified pulse response characteristics of a fourth plurality of location base stations during the change of signal propagation in which the fourth plurality of location base stations participate from non-line-of-sight propagation to line-of-sight propagation, and wherein the determination module comprises: a selection module configured to select, depending on whether the signal propagation in which the location base station participates at the previous time is line-of-sight propagation or non-line-of-sight propagation, a corresponding classifier from the first classifier and the second classifier, wherein when the signal propagation in which the location base station participates at the previous time is line-of-sight propagation, the first classifier is selected, otherwise the second classifier is selected; and a classification module configured to use the selected classifier to determine, based on the variations of the plurality of specified pulse response characteristics of the location base station at this time, whether the signal propagation in which the location base station participates at this time is non-line-of-sight propagation.

In another aspect, the classifier is a single classifier, wherein positive training samples used for training the single classifier comprise variations of the plurality of specified pulse response characteristics of a fifth plurality of location base stations during the change of signal propagation in which the fifth plurality of location base stations participate from line-of-sight propagation to non-line-of-sight propagation and variations of the plurality of specified pulse response characteristics of a sixth plurality of location base stations during the change of signal propagation in which the sixth plurality of location base stations participate from non-line-of-sight propagation to non-line-of-sight propagation, and negative training samples used for training the classifier comprise variations of the plurality of specified pulse response characteristics of a seventh plurality of location base stations during the change of signal propagation in which the seventh plurality of location base stations participate from line-of-sight propagation to line-of-sight propagation and variations of the plurality of specified pulse response characteristics of an eighth plurality of location base stations during the change of signal propagation in which the eighth plurality of location base stations participate from non-line-of-sight propagation to line-of-sight propagation.

Figure 6B:
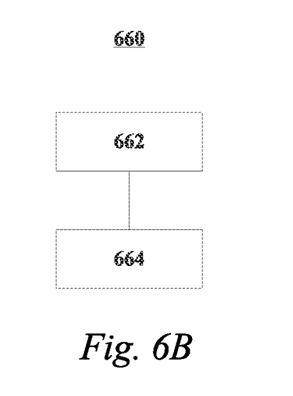
FIG. 6B shows a schematic diagram of a detection apparatus according to another embodiment of the present disclosure.

FIG. 6B shows a schematic diagram of a detection apparatus according to another embodiment of the present disclosure. The detection apparatus 660 shown in FIG. 6B may be implemented by software, hardware, or a combination of software and hardware. The detection apparatus 660 shown in FIG. 6B may be, for example, installed on any computing device having a computing capability.

As shown in FIG. 6B, the detection apparatus 660 may comprise a calculation module 662 and a determination module 664. The calculation module 662 is configured to use, when a location base station in an ultra-wideband location system receives a pulse response from a location tag, the received pulse response to calculate values of a plurality of specified pulse response characteristics. The determination module 664 is configured to determine a level of a ranging error of the location base station based on the calculated values of the plurality of pulse response characteristics and by means of a trained classifier, wherein the classifier is trained to be able to classify a ranging error of any location base station as a corresponding level based on values of the plurality of pulse response characteristics of the location base station.

Figure 7:
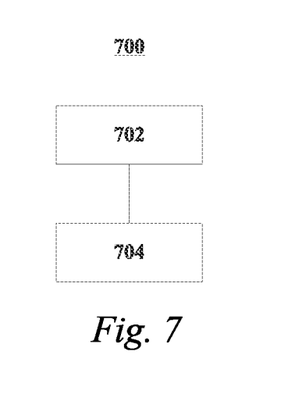
FIG. 7 shows a schematic diagram of a computing device according to one embodiment of the present disclosure.

FIG. 7 shows a schematic diagram of a computing device according to one embodiment of the present disclosure. As shown in FIG. 7, the computing device 700 may comprise a processor 702 and a memory 704 coupled to the processor 702. The memory 704 stores an executable instruction that, when executed, causes the processor 702 to perform any of the above-mentioned methods.

The embodiments of the present disclosure further provide a machine-readable storage medium having an executable instruction stored thereon that, when executed, causes a machine to perform any of the above-mentioned methods.

Those skilled in the art should understand that various variations, modifications, and changes may be made to the various embodiments disclosed above without departing from the essence of the disclosure, and these variations, modifications, and changes shall all fall within the protection scope of the present disclosure. Therefore, the protection scope of the present disclosure is defined by the entire disclosure herein.

The invention claimed is:

1. A detection method, comprising:
  calculating, when a first of at least one location base station in an ultra-wideband location system receives a pulse response from a location tag at a first time, values of a plurality of specified pulse response characteristics by using the received pulse response, and using the calculated values as values of the plurality of specified pulse response characteristics of the first of at least one location base station at the first time;
  calculating differences between the values of the plurality of specified pulse response characteristics of the first of at least one location base station at the first time and values of the plurality of specified pulse response characteristics of the first of at least one location base station at a previous time, and using the calculated differences as variations of the plurality of specified pulse response characteristics of the first of at least one location base station at the first time; and
  determining, based on at least the variations of the plurality of specified pulse response characteristics of the first of at least one location base station at the first time using at least one trained classifier, at least one of when signal propagation in which the first of at least one location base station participates at the first time is non-line-of-sight propagation, and when signal propagation in which the first location base station participates at the first time is line-of-sight propagation,
  wherein the classifier is trained to classify, based on the variations of the plurality of specified pulse response characteristics of any of the at least one location base station in the ultra-wideband location system, signal propagation in which the first of at least one location base station participates as line-of-sight propagation or non-line-of-sight propagation.

2. The detection method of claim 1, wherein:
  the at least one classifier comprises a first classifier and a second classifier;
  the variations of the plurality of specified pulse response characteristics of a first plurality of the at least one location base station during a change of signal propagation in which a first plurality of the at least one location base station participate from line-of-sight propagation to non-line-of-sight propagation are used as positive training samples in training the first classifier, and variations of the plurality of specified pulse response characteristics of a second plurality of the at least one location base station during the change of signal propagation in which the second plurality of the at least one location base station participate from line-of-sight propagation to line-of-sight propagation are used as negative training samples in training the first classifier;
  the variations of the plurality of specified pulse response characteristics of a third plurality of the at least one location base station during the change of signal propagation in which the third plurality of the at least one location base station participate from non-line-of-sight propagation to non-line-of-sight propagation are used as positive training samples in training the second classifier, and variations of the plurality of specified pulse response characteristics of a fourth plurality of the at least one location base station during the change of signal propagation in which the fourth plurality of the at least one location base station participate from non-line-of-sight propagation to line-of-sight propagation are used as negative training samples in training the second classifier; and
  said determining comprises:
    selecting, depending on whether the signal propagation in which the first location base station participates at the previous time is line-of-sight propagation or non-line-of-sight propagation, a corresponding classifier from the first classifier and the second classifier, wherein when the signal propagation in which the first location base station participates at the previous time is line-of-sight propagation, the first classifier is selected, otherwise the second classifier is selected; and determining, based on the variations of the plurality of specified pulse response characteristics of the first location base station at the first time and using the selected classifier, whether the signal propagation in which the first location base station participates at the first time is non-line-of-sight propagation.

3. The detection method of claim 1, wherein:

the at least one classifier is a single classifier;

positive training samples used for training the single classifier comprise variations of the plurality of specified pulse response characteristics of a fifth plurality of the at least one location base station during a change of signal propagation in which the fifth plurality of the at least one location base station participate from line-of-sight propagation to non-line-of-sight propagation, and variations of the plurality of specified pulse response characteristics of a sixth plurality of the at least one location base station during the change of signal propagation in which the sixth plurality of the at least one location base station participate from non-line-of-sight propagation to non-line-of-sight propagation; and negative training samples used for training the classifier comprise variations of the plurality of specified pulse response characteristics of a seventh plurality of the at least one location base station during the change of signal propagation in which the seventh plurality of the at least one location base station participate from line-of-sight propagation to line-of-sight propagation, and variations of the plurality of specified pulse response characteristics of an eighth plurality of the at least one location base station during the change of signal propagation in which the eighth plurality of the at least one location base station participate from non-line-of-sight propagation to line-of-sight propagation.

4. The detection method of claim 1, wherein the ultra-wideband location system comprises:

a processor; and a memory storing executable instructions that, when executed, cause the processor to perform the method of claim 1.

5. The detection method of claim 1, wherein the ultra-wideband location system comprises:

a machine-readable storage medium having executable instructions thereon that, when executed, cause a machine to perform the method of claim 1.

6. A detection method, comprising:

calculating, when a location base station in an ultra-wideband location system receives a pulse response from a location tag, values of a plurality of specified pulse response characteristics by using the received pulse response; and determining, based on the calculated values of the plurality of pulse response characteristics and using a trained classifier, a level of a ranging error of the location base station, wherein the classifier is trained to classify a ranging error of the location base station as a corresponding level based on the values of the plurality of pulse response characteristics of the location base station in the ultra-wideband location system.

7. The method of claim 6, wherein:

the ultra-wideband location system includes at least one further location base station;

a calculation module is configured to calculate the values of the plurality of specified pulse response characteristics by using the received pulse response;

a determination module is configured to determine the level of the ranging error of the location base station; and the classifier is trained to classify a respective ranging error for each of the at least one further location base station as a corresponding level based on values of the plurality of pulse response characteristics of the location base station.

8. A detection apparatus, comprising:

a first calculation module configured to calculate, when a first of at least one location base station in an ultra-wideband location system receives a pulse response from a location tag at a first time, values of a plurality of specified pulse response characteristics by using the received pulse response, and use the calculated values as values of the plurality of specified pulse response characteristics of the first location base station at the first time;

a second calculation module configured to calculate differences between the values of the plurality of specified pulse response characteristics of the first location base station at the first time and values of the plurality of specified pulse response characteristics of the first location base station at a previous time as variations of the plurality of specified pulse response characteristics of the first location base station at the first time; and a determination module configured to determine, based on at least the variations of the plurality of specified pulse response characteristics of the first location base station at the first time and by using at least one trained classifier, when signal propagation in which the first location base station participates at the first time is non-line-of-sight propagation, wherein the at least one classifier is trained to classify, based on the variations of the plurality of specified pulse response characteristics of any of the at least one location base station in the ultra-wideband location system, signal propagation in which the first location base station participates as line-of-sight propagation or non-line-of-sight propagation.

9. The detection apparatus of claim 8, wherein:

the at least one classifier comprises a first classifier and a second classifier;

the variations of the plurality of specified pulse response characteristics of a first plurality of the at least one location base station during the change of signal propagation in which the first plurality of location base stations participate from line-of-sight propagation to non-line-of-sight propagation are used as positive training samples in training the first classifier, and variations of the plurality of specified pulse response characteristics of a second plurality of the at least one location base stations during the change of signal propagation in which the second plurality of location base station participate from line-of-sight propagation to line-of-sight propagation are used as negative training samples in training the first classifier;

the variations of the plurality of specified pulse response characteristics of a third plurality of the at least one location base station during the change of signal propagation in which the third plurality of the at least one location base station participate from non-line-of-sight propagation to non-line-of-sight propagation are used as positive training samples in training the second classifier, and variations of the plurality of specified pulse response characteristics of a fourth plurality of location base stations during the change of signal propagation in which the fourth plurality of the at least one location base station participate from non-line-of-sight propagation to line-of-sight propagation are used as negative training samples in training the second classifier; and the determination module comprises:
  a selection module configured to select, depending on whether the signal propagation in which the first location base station participates at the previous time is line-of-sight propagation or non-line-of-sight propagation, a corresponding classifier from the first classifier and the second classifier, wherein when the signal propagation in which the first location base station participates at the previous time is line-of-sight propagation, the first classifier is selected, otherwise the second classifier is selected; and
  a classification module configured to determine, based on the variations of the plurality of specified pulse response characteristics of the first location base station at the first time and using the selected classifier, whether the signal propagation in which the location base station participates at the first time is non-line-of-sight propagation.

10. The detection apparatus of claim 8, wherein:

the classifier is a single classifier;

positive training samples used for training the single classifier comprise variations of the plurality of specified pulse response characteristics of a fifth plurality of the at least one location base station during a change of signal propagation in which the fifth plurality of the at least one location base station participate from line-of-sight propagation to non-line-of-sight propagation, and variations of the plurality of specified pulse response characteristics of a sixth plurality of the at least one location base station during the change of signal propagation in which the sixth plurality of the at least one location base station participate from non-line-of-sight propagation to non-line-of-sight propagation; and negative training samples used for training the classifier comprise variations of the plurality of specified pulse response characteristics of a seventh plurality of the at least one location base station during the change of signal propagation in which the seventh plurality of the at least one location base station participate from line-of-sight propagation to line-of-sight propagation and variations of the plurality of specified pulse response characteristics of an eighth plurality of the at least one location base station during the change of signal propagation in which the eighth plurality of the at least one location base station participate from non-line-of-sight propagation to line-of-sight propagation.

\* \* \* \* \*